United States Patent
Benner et al.

(10) Patent No.: US 7,513,153 B2
(45) Date of Patent: Apr. 7, 2009

(54) FILLING LEVEL SENSOR

(75) Inventors: Hans-Guenter Benner, Kriftel (DE); Karl Eck, Frankfurt (DE); Bernd Pauer, Eppstein (DE); Zlatko Penzar, Frankfurt am Main (DE); Knut Schröter, Oberursel (DE); Paul-Dieter Wiesberg, Frankfurt (DE)

(73) Assignee: Siemens Aktiengesellschaft, Munich (DE)

( * ) Notice: Subject to any disclaimer, the term of this patent is extended or adjusted under 35 U.S.C. 154(b) by 238 days.

(21) Appl. No.: 11/473,287

(22) Filed: Jun. 21, 2006

(65) Prior Publication Data

US 2007/0006647 A1 Jan. 11, 2007

(30) Foreign Application Priority Data

Jun. 24, 2005 (DE) .................. 10 2005 029 785

(51) Int. Cl.
*G01F 23/00* (2006.01)
(52) U.S. Cl. ................................... 73/290 R
(58) Field of Classification Search .................. 73/313, 73/290 R; 340/612, 618; 702/55
See application file for complete search history.

(56) References Cited

U.S. PATENT DOCUMENTS

| 3,403,376 | A | | 9/1968 | Kraft et al. ............... 340/450.2 |
|---|---|---|---|---|
| 3,756,080 | A | | 9/1973 | Pringle ..................... 73/290 R |
| 5,357,815 | A | | 10/1994 | Williamson ................ 73/866.3 |
| 5,992,679 | A | * | 11/1999 | Porchia et al. ............... 220/782 |
| 6,401,533 | B1 | * | 6/2002 | Gier et al. ..................... 73/313 |

FOREIGN PATENT DOCUMENTS

| DE | 297 00 625 U1 | | 4/1997 |
|---|---|---|---|
| JP | 08330703 A | * | 12/1996 |
| WO | WO 96/41136 | | 12/1996 |

* cited by examiner

*Primary Examiner*—Hezron Williams
*Assistant Examiner*—Tamiko D Bellamy
(74) *Attorney, Agent, or Firm*—Cohen Pontani Lieberman & Pavane LLP

(57) ABSTRACT

The invention relates to a filling level sensor for a fuel tank 2, comprising a ceramic mounting plate 5 with a resistance network 6 arranged thereon and a contact structure 8 for the detection of an electrical filling level signal, and a cover 9 connected to the mounting plate 5, the cover 9 and the mounting plate 5 forming a housing 10. The cover 9 is strengthened in its edge area.

10 Claims, 2 Drawing Sheets

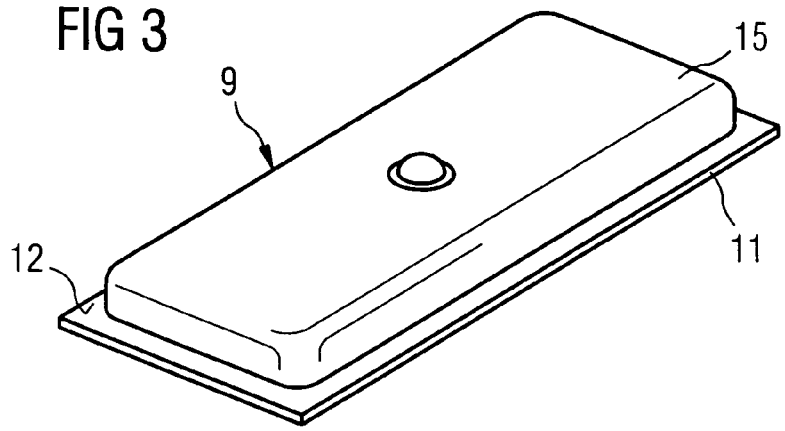
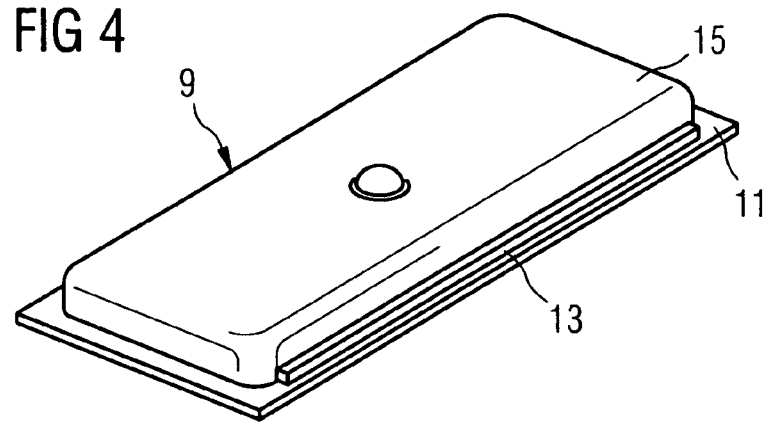
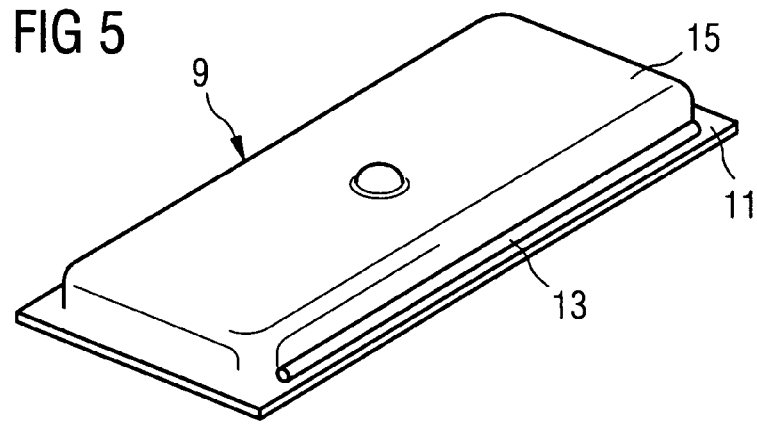
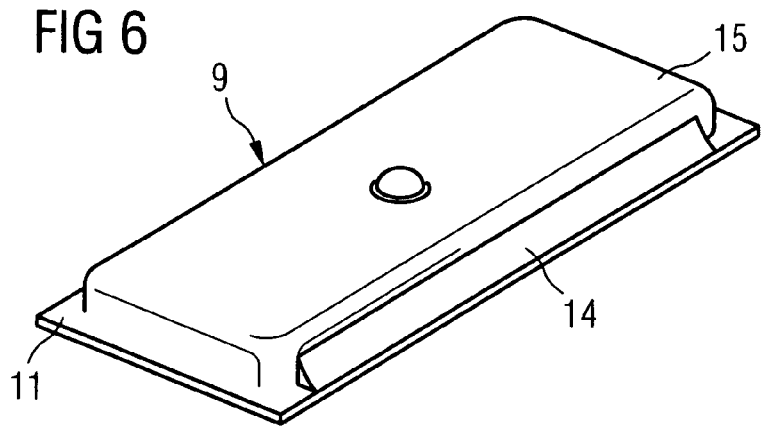

FILLING LEVEL SENSOR

The subject of the invention is a filling level sensor for a fuel tank, comprising a ceramic mounting plate with a resistance network arranged thereon and a contact structure for the detection of an electrical filling level signal, and a cover connected to the mounting plate, the cover and the mounting plate forming a housing.

The housing of such sensors serves to accommodate various sensor components, in order to protect them against aggressive media. Where a sensor is used in a fuel tank, the housing must primarily be fuel-resistant and liquid-tight. A thin-walled metal cover is already used for this purpose, which in addition to the liquid-tight design of the housing at the same time affords adequate protection in that it is dimensionally stable under pressures in the order of 70 to 100 mbar occurring in the operation of the fuel tank. If the filling level sensor is already incorporated into a plastic preform used to form the subsequent fuel tank, rather than being fitted in the finished fuel tank, the filling level sensor may be exposed to substantially higher pressures in the order of 8 bar to 12 bar during the fuel tank manufacturing process. These high pressures result in deformations of the cover and the mounting plate, which in turn lead to fracture of the mounting plate, with the result that the tightness of the housing is no longer assured.

The object of the invention therefore is to create a filling level sensor, which in addition to resistance to ambient influences in its place of use is also resistant to pre-assembly under harsher ambient influences.

BRIEF DESCRIPTION OF THE INVENTION

According to the invention this object is achieved in that the cover is strengthened in its edge area.

Strengthening the cover in its edge area is an especially easy way of achieving a mechanical strengthening of the housing and therefore greater resistance of the cover to deformations, which in turn means that the mounting plate is more firmly supported, so that it is deformed to a lesser extent under greater pressures acting on the housing and is therefore not damaged, thereby maintaining the tightness of the housing. Since the strengthening relates solely to the cover, the remaining component parts of the filling level sensor can continue to be used without modification. Strengthening of the cover affords protection not only at high pressures, however, but also at very low pressures compared to normal pressure.

An edge which has a greater wall thickness than the upper, plane area of the cover avoids the need to use additional strengthening components.

Substantially reduced manufacturing costs can be achieved by means of a cover which, although it has a greater wall thickness, also has a constant wall thickness. The cover therefore has a wall thickness of 0.8 mm in contrast to unstrengthened covers with unstrengthened areas in which the wall thickness is 0.4 mm.

In another advantageous development the strengthening of the edge area is achieved by a metal frame fitted on the side of the edge remote from the mounting plate. This embodiment has the advantage that with the metal frame only one additional component has to be provided in order to obtain the required strengthening.

A strengthening of the covers of filling level sensors of various dimensions is easily achieved if metal strips are arranged along the lateral faces on the side of the edge remote from the mounting plate. The advantage is that the metal strips can be inexpensively adapted to different dimensions of the cover. The metal strips may have both a rectangular and a circular cross section.

It may be sufficient, depending on the loads acting on the housing, to arrange the metal strips on the edge along two lateral faces, preferably oriented longitudinally.

In a further development fillet joints are applied in the areas formed by the lateral faces and the edge of the cover, in order to increase the mechanical rigidity. The fillet joints may be arranged along all lateral faces or along selected lateral faces.

The cost of providing the fillet joints proves to be low if the fillet joints are applied by soldering.

BRIEF DESCRIPTION OF THE DRAWINGS

The invention will be explained in more detail with reference to a number of exemplary embodiments. In the drawings:

FIG. 3-6 show perspective views of further embodiments of the cover according to FIG. 2.

DETAILED DESCRIPTION OF THE INVENTION

Figure 1:
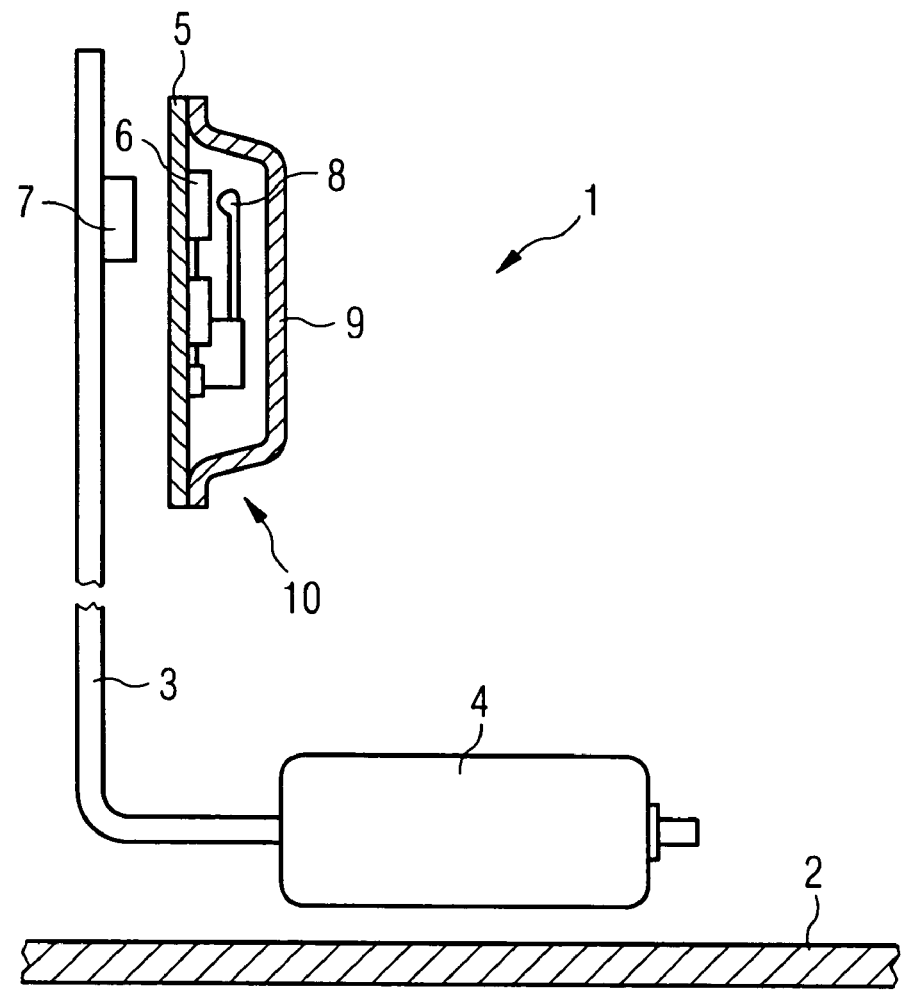
FIG. 1 shows an unstrengthened filling level sensor in a fuel tank.

The filling level sensor 1 represented in FIG. 1 is arranged in a fuel tank 2. The filling level sensor 1 comprises a pivotally supported lever arm 3, at one end of which a float 4 is supported. The filling level sensor 1 furthermore has a ceramic mounting plate 5, on which an electrical resistance network 6 is applied. A contact structure 8, which can be deflected by the lever arm 3 by means of a magnet 7, generates an electrical filling level signal as a function of the lever arm position. The mounting plate 5 is connected to the cover 9, forming a housing 10 in such a way that the resistance network 6 and the contact structure 8 are sealed off from the surroundings.

Figure 2:
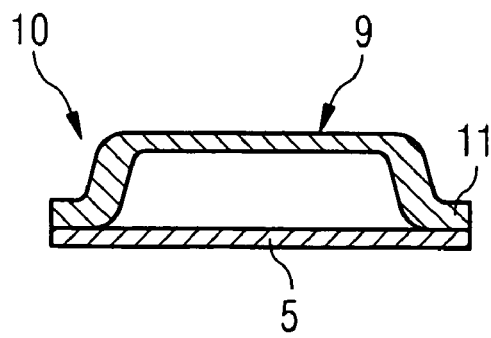
FIG. 2 shows a sectional representation of the cover of an inventive filling level sensor according to FIG. 1.

FIG. 2 shows the housing 10 of the filling level sensor 1 comprising the cover 9 and the mounting plate 5. At 0.8 mm, the edge 11 has a greater wall thickness than the upper, plane area of the cover 9, which has a wall thickness of 0.4 mm. This provides the cover 9 with an adequate mechanical strengthening.

Figure 2A:
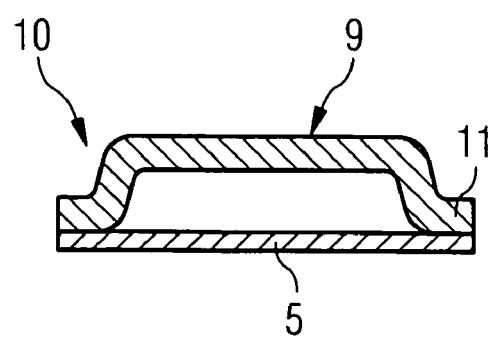
FIG. 2a shows a further embodiment according to FIG. 2.

FIG. 2a shows a further embodiment of the filling level sensor 1, which differs from FIG. 2 in that the cover 9 has a constant wall thickness of 0.8 mm, whilst the mounting plate 5 has a thickness of approximately 0.6 mm.

The cover 9 represented in FIG. 3 has a metal frame 12 for strengthening, which is arranged by soldering on the side of the edge 11 remote from the mounting plate.

In FIGS. 4 and 5 metal strips 13 are soldered onto the side of the edge 11 remote from the mounting plate in order to strengthen the cover 9. The metal strips have a rectangular and circular cross section. In the representations shown the metal strips 13 are arranged parallel to the longest extent of the cover 9.

In the cover 9 shown in FIG. 6 the mechanical strengthening is achieved by means of fillet joints 14, which are arranged in the areas formed by the lateral faces 15 and the edge 11 of the cover 9, the fillet joints 14 likewise being arranged only in the areas which run parallel to the longest extent of the cover 9.

The invention claimed is:

1. A filling level sensor for a fuel tank, comprising:
    a ceramic mounting plate with a resistance network arranged thereon and a contact structure configured to detect an electrical filling level signal; and
    a cover connected to the ceramic mounting plate, the cover and the ceramic mounting plate forming a housing which surrounds the resistance network;
    wherein the cover is strengthened at its edge area.

2. The filling level sensor as claimed in claim 1, wherein the edge has a greater wall thickness than other wall areas of the cover.

3. The filling level sensor as claimed in claim 2, wherein the strengthened edge area has a wall thickness of 0.8 mm.

4. The filling level sensor as claimed in claim 1, wherein the cover has a uniform wall thickness of at least 0.8 mm.

5. A filling level sensor for a fuel tank, comprising:
    a ceramic mounting plate with a resistance network arranged thereon and a contact structure for the detection of an electrical filling level signal;
    a cover connected to the ceramic mounting plate, the cover and the ceramic mounting plate forming a housing; and
    a metal frame is fitted on a side of an edge of the cover remote from the ceramic mounting plate;
    wherein the cover is strengthened at its edge area.

6. A filling level sensor for a fuel tank, comprising:
    a ceramic mounting plate with a resistance network arranged thereon and a contact structure for the detection of an electrical filling level signal;
    a cover connected to the ceramic mounting plate, the cover and the ceramic mounting plate forming a housing; and
    metal strips arranged along lateral faces of the cover on a side of an edge remote from the ceramic mounting plate;
    wherein the cover is strengthened at its edge area.

7. The filling level sensor as claimed in claim 6, wherein the metal strips are arranged on the edge along two lateral faces.

8. The filling level sensor for a fuel tank, comprising:
    a ceramic mounting plate with a resistance network arranged thereon and a contact structure for the detection of an electrical filling level signal;
    a cover connected to the ceramic mounting plate, the cover and the ceramic mounting plate forming a housing; and
    fillet joints applied in areas formed by a lateral face and an edge of the cover;
    wherein the cover is strengthened at its edge area.

9. The filling level sensor as claimed in claim 8, wherein the fillet joints are soldered into the areas formed by the lateral face and the edge.

10. The filling level sensor as claimed in claim 7, wherein the metal strips are oriented longitudinally on the edge along the two lateral faces.

* * * * *